(12) United States Patent
Li et al.

(10) Patent No.: US 8,934,473 B2
(45) Date of Patent: *Jan. 13, 2015

(54) METHOD AND APPARATUS USING CELL-SPECIFIC AND COMMON PILOT SUBCARRIERS IN MULTI-CARRIER, MULTI-CELL WIRELESS COMMUNICATION NETWORKS

(71) Applicant: Neocific, Inc., Bellevue, WA (US)

(72) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: Neocific, Inc., Bellevue, WA (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/874,278

(22) Filed: Apr. 30, 2013

(65) Prior Publication Data

US 2013/0242937 A1    Sep. 19, 2013

Related U.S. Application Data

(63) Continuation of application No. 13/212,116, filed on Aug. 17, 2011, now Pat. No. 8,432,891, which is a (Continued)

(51) Int. Cl.
*H04J 3/06* (2006.01)
*H04W 72/04* (2009.01)
(Continued)

(52) U.S. Cl.
CPC .......... *H04W 72/0446* (2013.01); *H04W 16/02* (2013.01); *H04L 27/2613* (2013.01);
(Continued)

(58) Field of Classification Search
CPC ................ H04B 1/707; H04L 25/0228; H04L 25/03834; H04L 27/0008; H04L 27/0012; H04L 27/2602; H04L 27/2607; H04L 27/2613; H04L 27/2655; H04L 27/2657; H04L 5/0007; H04L 5/0016; H04L 5/0028

USPC ......... 370/350, 324, 331–332, 319, 344, 329, 370/338, 328, 203, 280, 342, 335; 455/67.11–67.13, 423, 503, 115.1, 455/436–444, 502, 552.1, 562.1, 422.1, 455/434, 525
See application file for complete search history.

(56) References Cited

U.S. PATENT DOCUMENTS 5,825,807 A    10/1998  Kumar
5,867,478 A     2/1999  Baum et al.
(Continued)

FOREIGN PATENT DOCUMENTS

EP    1650891 A1    4/2006
JP    9233047 A     9/1997
(Continued)

OTHER PUBLICATIONS

U.S. Appl. No. 13/861,942, filed Apr. 12, 2013, Li et al.
(Continued)

*Primary Examiner* — Babar Sarwar
(74) *Attorney, Agent, or Firm* — Perkins Coie LLP

(57) ABSTRACT

A multi-carrier cellular wireless network (400) employs base stations (404) that transmit two different groups of pilot subcarriers: (1) cell-specific pilot subcarriers, which are used by a receiver to extract information unique to each individual cell (402), and (2) common pilots subcarriers, which are designed to possess a set of characteristics common to all the base stations (404) of the system. The design criteria and transmission formats of the cell-specific and common pilot subcarriers are specified to enable a receiver to perform different system functions. The methods and processes can be extended to other systems, such as those with multiple antennas in an individual sector and those where some subcarriers bear common network/system information.

12 Claims, 13 Drawing Sheets

Related U.S. Application Data continuation of application No. 10/583,530, filed as application No. PCT/US2005/001939 on Jan. 20, 2005, now Pat. No. 8,009,660.

(60) Provisional application No. 60/540,032, filed on Jan. 29, 2004.

(51) Int. Cl.
| | |
|---|---|
| *H04W 16/02* | (2009.01) |
| *H04L 27/26* | (2006.01) |
| *H04B 1/707* | (2011.01) |
| *H04L 5/00* | (2006.01) |
| *H04L 25/03* | (2006.01) |
| *H04L 27/00* | (2006.01) |
| *H04L 25/02* | (2006.01) |

(52) U.S. Cl.
CPC .............. *H04B1/707* (2013.01); *H04L 5/0007* (2013.01); *H04L 5/0028* (2013.01); *H04L 25/03834* (2013.01); *H04L 27/0008* (2013.01); *H04L 27/0012* (2013.01); *H04L 27/2602* (2013.01); *H04L 27/2657* (2013.01); *H04L 5/0016* (2013.01); *H04L 25/0228* (2013.01); *H04L 27/2607* (2013.01); *H04L 27/2655* (2013.01)
USPC ........... 370/350; 370/331; 370/332; 370/324; 370/344; 370/319; 455/422.1; 455/552.1; 455/502; 455/561; 455/434

(56) References Cited

U.S. PATENT DOCUMENTS

| | | | | |
|---|---|---|---|---|
| 6,480,558 | B1 * | 11/2002 | Ottosson et al. | 375/350 |
| 6,515,960 | B1 * | 2/2003 | Usui et al. | 370/203 |
| 6,567,383 | B1 * | 5/2003 | Bohnke | 370/280 |
| 6,643,281 | B1 * | 11/2003 | Ryan | 370/350 |
| 6,731,673 | B1 * | 5/2004 | Kotov et al. | 375/145 |
| 6,741,578 | B1 * | 5/2004 | Moon et al. | 370/335 |
| 6,847,678 | B2 | 1/2005 | Berezdivin et al. | |
| 6,922,388 | B1 * | 7/2005 | Laroia et al. | 370/208 |
| 6,940,827 | B2 | 9/2005 | Li et al. | |
| 7,035,663 | B1 | 4/2006 | Linebarger et al. | |
| 7,039,001 | B2 * | 5/2006 | Krishnan et al. | 370/203 |
| 7,062,002 | B1 * | 6/2006 | Michel et al. | 375/354 |
| 7,123,934 | B1 | 10/2006 | Linebarger et al. | |
| 7,161,985 | B2 | 1/2007 | Dostert et al. | |
| 7,161,987 | B2 | 1/2007 | Webster et al. | |
| 7,218,666 | B2 | 5/2007 | Baum et al. | |
| 7,260,054 | B2 | 8/2007 | Olszewski | |
| 7,342,974 | B2 | 3/2008 | Chiou | |
| 7,386,055 | B2 | 6/2008 | Morita et al. | |
| 7,403,556 | B2 | 7/2008 | Kao et al. | |
| 7,418,042 | B2 | 8/2008 | Choi et al. | |
| 7,443,829 | B2 * | 10/2008 | Rizvi et al. | 370/342 |
| 7,548,506 | B2 | 6/2009 | Ma et al. | |
| 7,555,268 | B2 | 6/2009 | Trachewsky et al. | |
| 7,567,624 | B1 | 7/2009 | Schmidl et al. | |
| 7,646,747 | B2 | 1/2010 | Atarashi et al. | |
| 7,693,032 | B2 | 4/2010 | Li et al. | |
| 7,724,720 | B2 | 5/2010 | Korpela et al. | |
| 7,738,437 | B2 | 6/2010 | Ma et al. | |
| 7,864,725 | B2 | 1/2011 | Li et al. | |
| 7,907,592 | B2 * | 3/2011 | Han et al. | 370/350 |
| 8,009,660 | B2 | 8/2011 | Li et al. | |
| 8,089,887 | B2 | 1/2012 | Lippman et al. | |
| 8,094,611 | B2 | 1/2012 | Li et al. | |
| 8,428,009 | B2 | 4/2013 | Li et al. | |
| 2003/0081538 | A1 * | 5/2003 | Walton et al. | 370/206 |
| 2004/0085946 | A1 * | 5/2004 | Morita et al. | 370/342 |
| 2005/0111397 | A1 | 5/2005 | Attar et al. | |
| 2011/0299474 | A1 | 12/2011 | Li et al. | |

FOREIGN PATENT DOCUMENTS

| | | |
|---|---|---|
| JP | 10210002 A | 8/1998 |
| KR | 20010083789 A | 9/2001 |
| KR | 1020030060892 | 7/2003 |
| KR | 20090040929 | 4/2009 |

OTHER PUBLICATIONS

Examination Report, European Application No. 05711777.2, Mail Date Oct. 29, 2012, 6 pages.
International Search Report and Written Opinion for International Application No. PCT/US05/01939, Mail Date Apr. 26, 2005, 7 pages.
Supplementary European Search Report, European Application No. 05711777, May 7, 2012, 6 pages.
Tufvesson, F., et al. "OFDM Time and Frequency Synchronization by Spread Spectrum Pilot Technique," Communication Theory Mini-Conference, Vancouver, B.C., Canada, Jun. 6-10, 1999, pp. 115-119.

\* cited by examiner

METHOD AND APPARATUS USING CELL-SPECIFIC AND COMMON PILOT SUBCARRIERS IN MULTI-CARRIER, MULTI-CELL WIRELESS COMMUNICATION NETWORKS

CROSS-REFERENCE TO RELATED APPLICATION(S)

This application is a continuation of, and incorporates herein by reference in its entirety, U.S. patent application Ser. No. 13/212,116, entitled "METHODS AND APPARATUS USING CELL-SPECIFIC AND COMMON PILOT SUBCARRIERS IN MULTI-CARRIER, MULTI-CELL WIRELESS COMMUNICATION NETWORKS," filed Aug. 17, 2011, which is a continuation of, and incorporates herein by reference in its entirety, U.S. patent application Ser. No. 10/583,530, entitled "METHODS AND APPARATUS USING CELL-SPECIFIC AND COMMON PILOT SUBCARRIERS IN MULTI-CARRIER, MULTI-CELL WIRELESS COMMUNICATION NETWORKS," filed May 30, 2007 which is a U.S. National Stage of PCT Application No. PCT/US05/01939, entitled "METHODS AND APPARATUS FOR MULTI-CARRIER, MULTI-CELL WIRELESS COMMUNICATION NETWORKS," filed Jan. 20, 2005, which claims the benefit of and priority to U.S. Provisional Patent Application No. 60/540,032, entitled "METHODS AND APPARATUS FOR MULTI-CARRIER, MULTI-CELL WIRELESS COMMUNICATION NETWORKS," filed on Jan. 29, 2004.

BACKGROUND

In multi-carrier wireless communications, many important system functions such as frequency synchronization and channel estimation, depicted in FIG. 1, are facilitated by using the network information provided by a portion of total subcarriers such as pilot subcarriers. The fidelity level of the received subcarriers dictates how well these functions can be achieved, which in turn affect the efficiency and capacity of the entire network.

In a wireless network, there are a number of base stations, each of which provides coverage to designated areas, normally called a cell. If a cell is divided into sectors, from a system engineering point of view each sector can be considered a cell. In this context, the terms "cell" and "sector" are interchangeable. The network information can be categorized into two types: the cell-specific information that is unique to a particular cell, and the common information that is common to the entire network or to a portion of the entire networks such as a group of cells.

In a multi-cell environment, for example, the base station transmitter of each cell transmits its own pilot subcarriers, in addition to data carriers, to be used by the receivers within the cell. In such an environment, carrying out the pilot-dependent functions becomes a challenging task in that, in addition to the degradation due to multipath propagation channels, signals originated from the base stations at different cells interfere with each other.

One approach to deal with the interference problem has been to have each cell transmit a particular pattern of pilot subcarriers based on a certain type of cell-dependent random process. This approach, to a certain degree, has mitigated the impact of the mutual interference between the pilot subcarriers from adjacent cells; however, it has not provided for a careful and systematic consideration of the unique requirements of the pilot subcarriers.

DETAILED DESCRIPTION

In the following description the invention is explained with respect to some of its various embodiments, providing specific details for a thorough understanding and enablement. However, one skilled in the art will understand that the invention may be practiced without such details. In other instances, well-known structures and functions have not been shown or described in detail to avoid obscuring the depiction of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
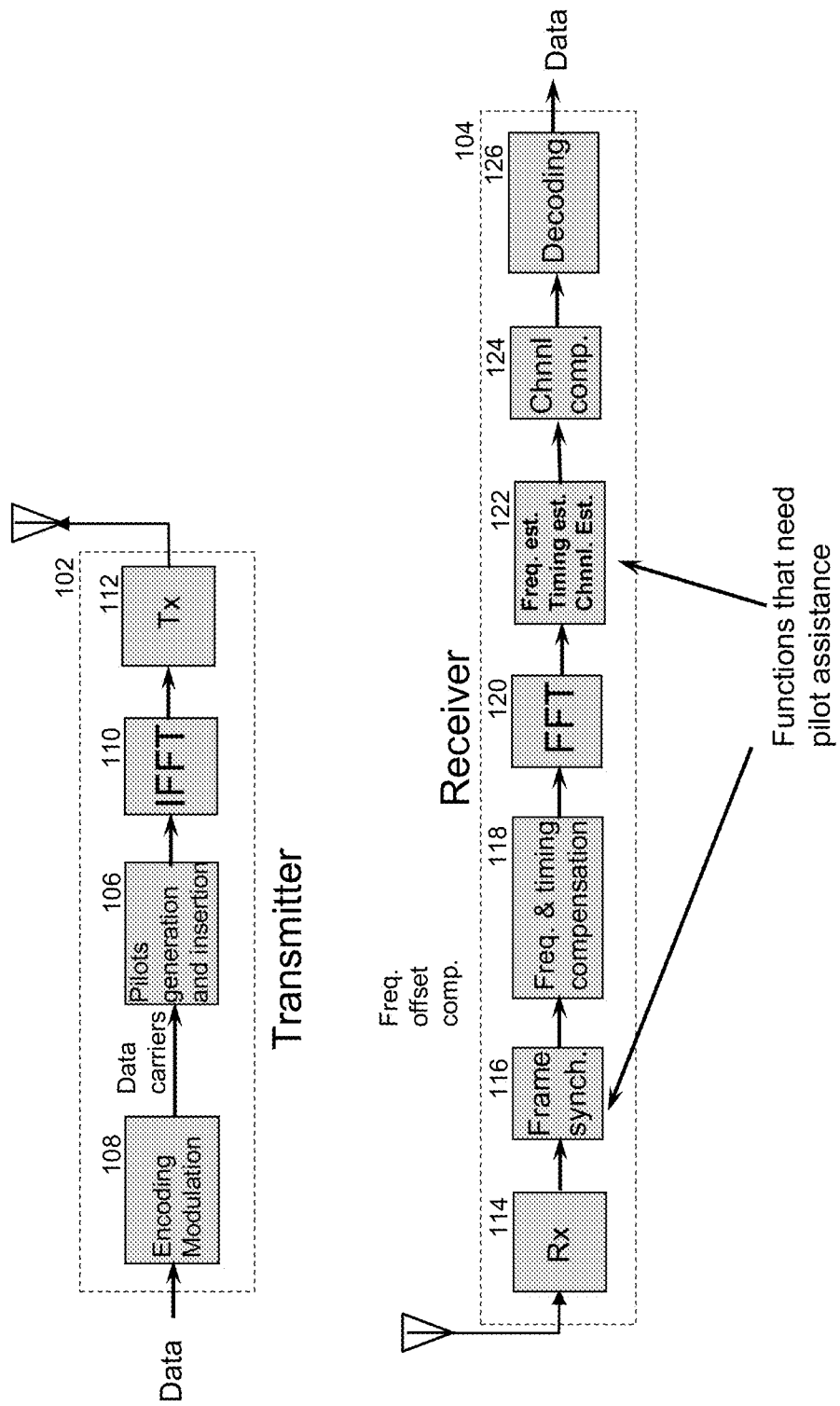
FIG. 1 depicts a basic multi-carrier wireless communication system consisting of a transmitter and a receiver.

FIG. 1 depicts a basic multi-carrier wireless communication system consisting of a transmitter 102 and a receiver 104. A functional block 106 at the transmitter, called Pilot generation and insertion, generates pilot subcarriers and inserts them into predetermined frequency locations. These pilot subcarriers are used by the receiver to carry out certain functions. In aspects of this invention, pilot subcarriers are divided into two different groups according to their functionalities, and hence their distinct requirements. The transmission format of each group of pilot subcarriers will be designed so that it optimizes the performance of the system functions such as frequency synchronization and channel estimation.

The first group is called "cell-specific pilot subcarriers," and will be used by the receiver 104 to extract information unique to each individual cell. For example, these cell-specific pilot subcarriers can be used in channel estimation where it is necessary for a particular receiver to be able to differentiate the pilot subcarriers that are intended for its use from those of other cells. For these pilot subcarriers, counter-interference methods are necessary.

The second group is termed "common pilot sub-carriers," and are designed to possess a set of characteristics common to all base stations of the system. Thus, every receiver 104 within the system is able to exploit these common pilot subcarriers to perform necessary functions without interference problem. For instance, these common pilot subcarriers can be used in the frequency synchronization process, where it is not necessary to discriminate pilot subcarriers of different cells, but it is desirable for the receiver to combine coherently the energy of common pilot subcarriers with the same carrier index from different cells, so as to achieve relatively accurate frequency estimation.

Aspects of this invention provide methods to define the transmission formats of the cell-specific and common pilot subcarriers that enable a receiver to perform different system functions. In particular, a set of design criteria are provided for pilot subcarriers. Other features of this invention further provide apparatus or means to implement the above design processes and methods. In particular, signal reception can be improved by manipulating phase values of the pilot subcarriers and by using power control.

The methods and processes can also be extended to other cases, such as where multiple antennas are used within an individual sector and where some subcarriers are used to carry common network/system information. Base stations can be synchronized in frequency and time by sharing a common frequency oscillator or a common frequency reference signal, such as the one generated from the signals provided by the Global Positioning System (GPS).

Multi-Carrier Communication System

In a multi-carrier communication system such as multi-carrier code division multiple access (MC-CDMA) and orthogonal frequency division multiple access (OFDMA), information data are multiplexed on subcarriers that are mutually orthogonal in the frequency domain. In effect, a frequency selective channel is broken into a number of parallel but small segments in frequency that can be treated as flat fading channels and hence can be easily dealt with using simple one-tap equalizers. The modulation/demodulation can be performed using the fast Fourier transform (FFT).

In a multi-carrier communication system the physical media resource (e.g., radio or cable) can be divided in both the frequency and the time domains. This canonical division provides a high flexibility and fine granularity for resource sharing. The basic structure of a multi-carrier signal in the frequency domain is made up of subcarriers, and within a particular spectral band or channel there are a fixed number of subcarriers. There are three types of subcarriers:

1. Data subcarriers, which carry information data;
2. Pilot subcarriers, whose phases and amplitudes are predetermined and made known to all receivers and which are used for assisting system functions such as estimation of system parameters; and
3. Silent subcarriers, which have no energy and are used for guard bands and DC carriers.

Figure 2:
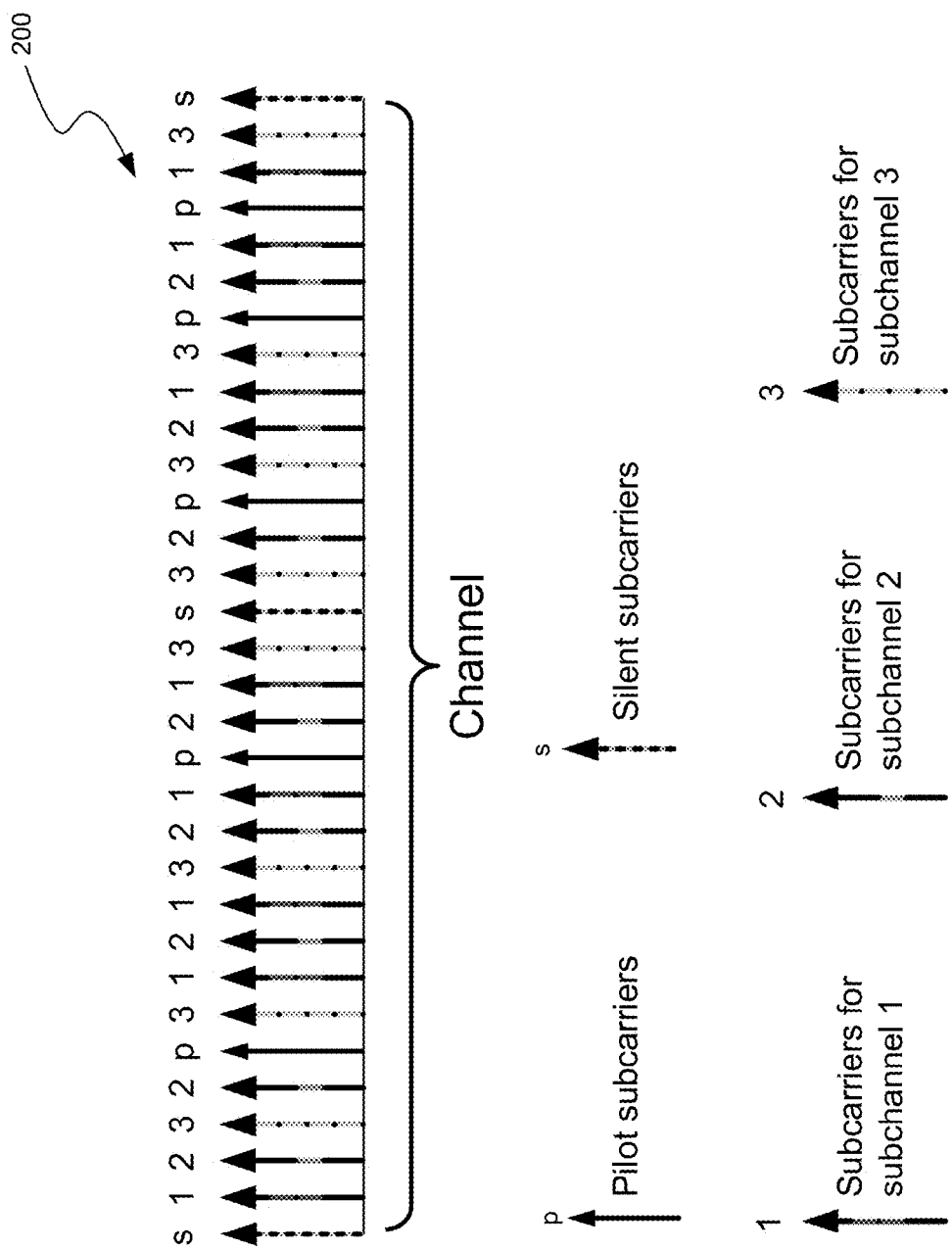
FIG. 2 shows basic structure of a multi-carrier signal in the frequency domain, which is made up of subcarriers.

The data subcarriers can be arranged into groups called subchannels to support multiple access and scalability. The subcarriers forming one subchannel are not necessarily adjacent to each other. This concept is illustrated in FIG. 2, showing a basic structure of a multi-carrier signal 200 in the frequency domain, which is made up of subcarriers. Data subcarriers can be grouped into subchannels in a particular way. The pilot subcarriers are also distributed over the entire channel in a particular way.

Figure 3:
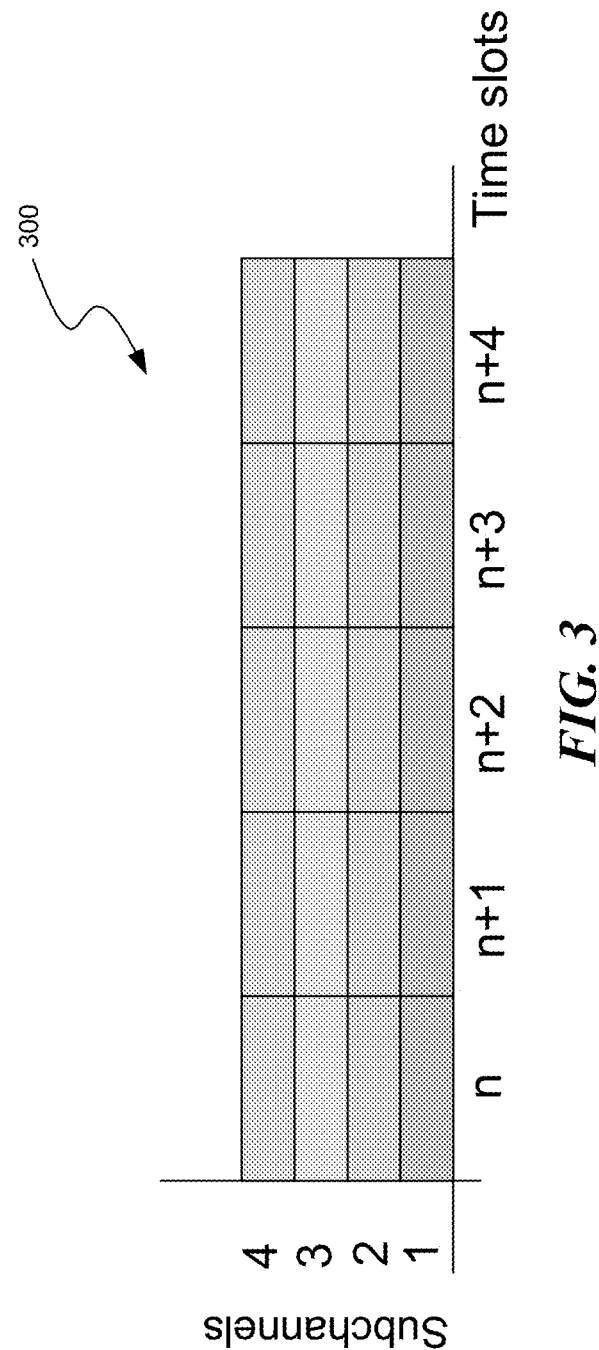
FIG. 3 shows a radio resource divided into small units in both the frequency and time domains: subchannels and time slots.

The basic structure of a multi-carrier signal in the time domain is made up of time slots to support multiple-access. The resource division in both the frequency and time domains is depicted in FIG. 3 which shows a radio resource divided into small units in both the frequency and time domains: subchannels and time slots, 300. The basic structure of a multi-carrier signal in the time domain is made up of time slots.

As depicted in FIG. 1, in a multi-carrier communication system, a generic transmitter may consist of the following functional blocks:
 1. Encoding and modulation 108
 2. Pilot generation and insertion 106
 3. Inverse fast Fourier transform (IFFT) 110
 4. Transmission 112

And a generic receiver may consist of the following functional blocks:
 1. Reception 114
 2. Frame synchronization 116
 3. Frequency and timing compensation 118
 4. Fast Fourier transform (FFT) 120
 5. Frequency, timing, and channel estimation 122
 6. Channel compensation 124
 7. Decoding 126

Cellular Wireless Networks

Figure 4:
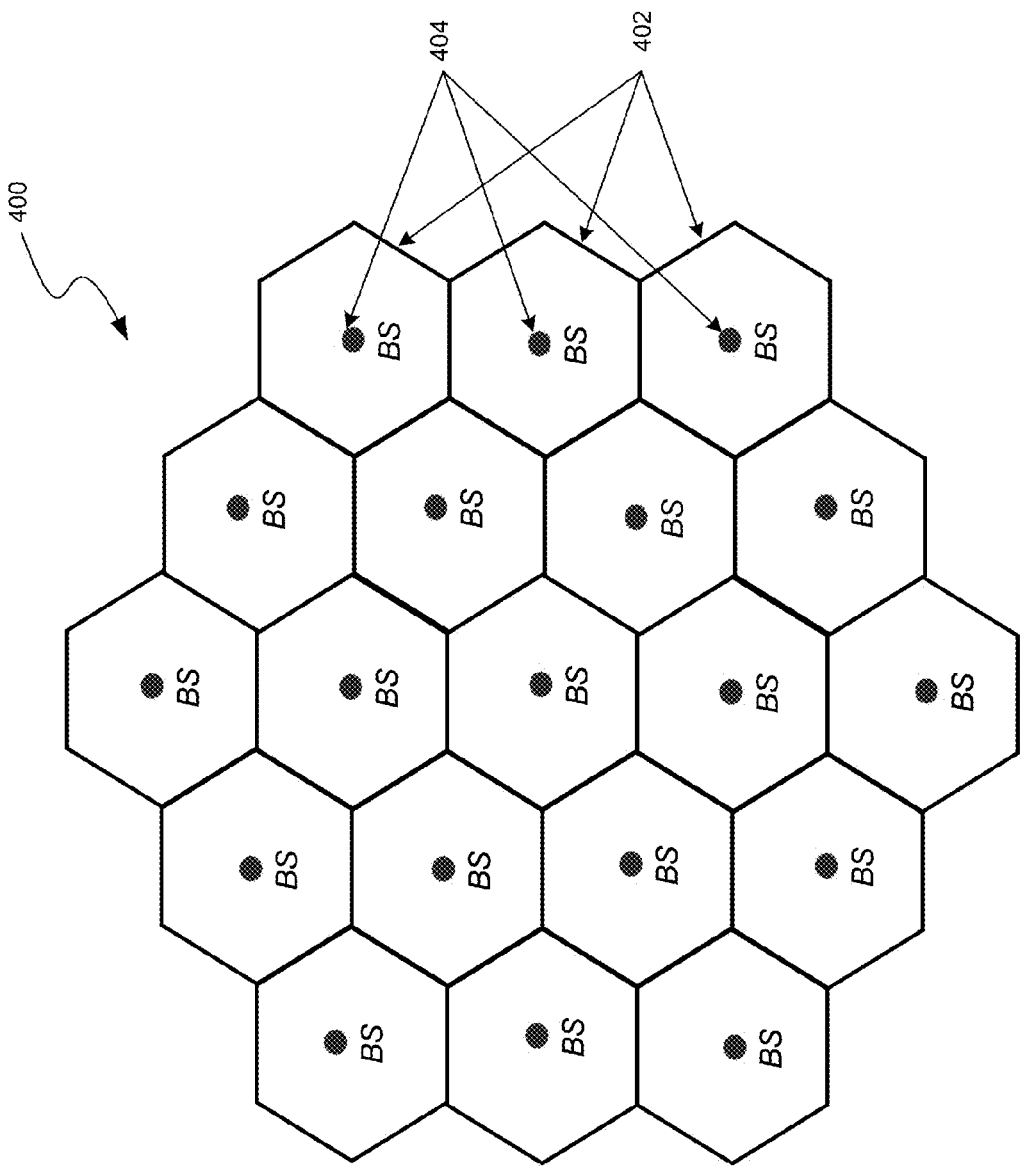
FIG. 4 depicts a cellular wireless network comprised of multiple cells, in each of which coverage is provided by a base station (BS).

In a cellular wireless network, the geographical region to be serviced by the network is normally divided into smaller areas called cells. In each cell the coverage is provided by a base station. Thus, this type of structure is normally referred to as the cellular structure depicted in FIG. 4, which illustrates a cellular wireless network 400 comprised of multiple cells 402, in each of which coverage is provided by a base station (BS) 404. Mobile stations are distributed within each coverage area.

A base station 404 is connected to the backbone of the network via a dedicated link and also provides radio links to mobile stations within its coverage. A base station 404 also serves as a focal point to distribute information to and collect information from its mobile stations by radio signals. The mobile stations within each coverage area are used as the interface between the users and the network.

In an M-cell wireless network arrangement, with one-way or two-way communication and time division or frequency division duplexing, the transmitters at all the cells are synchronized via a particular means and are transmitting simultaneously. In a specific cell 402 of this arrangement, the pth cell, a receiver receives a signal at a specific subcarrier, the ith subcarrier, at the time $t_k$, which can be described as:

$$s_i(t_k) = a_{i,p}(t_k)e^{j\varphi_{i,p}(t_k)} + \sum_{\substack{m=1\\m\neq p}}^{M} a_{i,m}(t_k)e^{j\varphi_{i,m}(t_k)} \quad (1)$$

where $a_{i,m}(t_k)$ and $\phi_{i,m}(t_k)$ denote the signal amplitude and phase, respectively, associated with the $i^{th}$ subcarrier from the base station of the $m_{th}$ cell.

Cell-Specific Pilot Subcarriers

If the ith subcarrier is used as a pilot subcarrier at the pth cell for the cell-specific purposes, the cell-specific information carried by $a_{i,p}(t_k)$) and $\phi_{i,p}(t_k)$) will be of interest to the receiver at the pth cell and other signals described by the second term on the right hand side of equation (1) will be interference, which is an incoherent sum of signals from other cells. In this case, a sufficient level of the carrier-to-interference ratio (CIR) is required to obtain the estimates of $a_{i,p}(t_k)$) and $\phi_{i,p}(t_k)$) with desirable accuracy.

There are many ways to boost the CIR. For examples, the amplitude of a pilot subcarrier can be set larger than that of a data subcarrier; power control can be applied to the pilot subcarriers; and cells adjacent to the pth cell may avoid using the ith subcarrier as pilot subcarrier. All these can be achieved with coordination between the cells based on certain processes, described below.

Common Pilot Subcarriers

Figure 5:
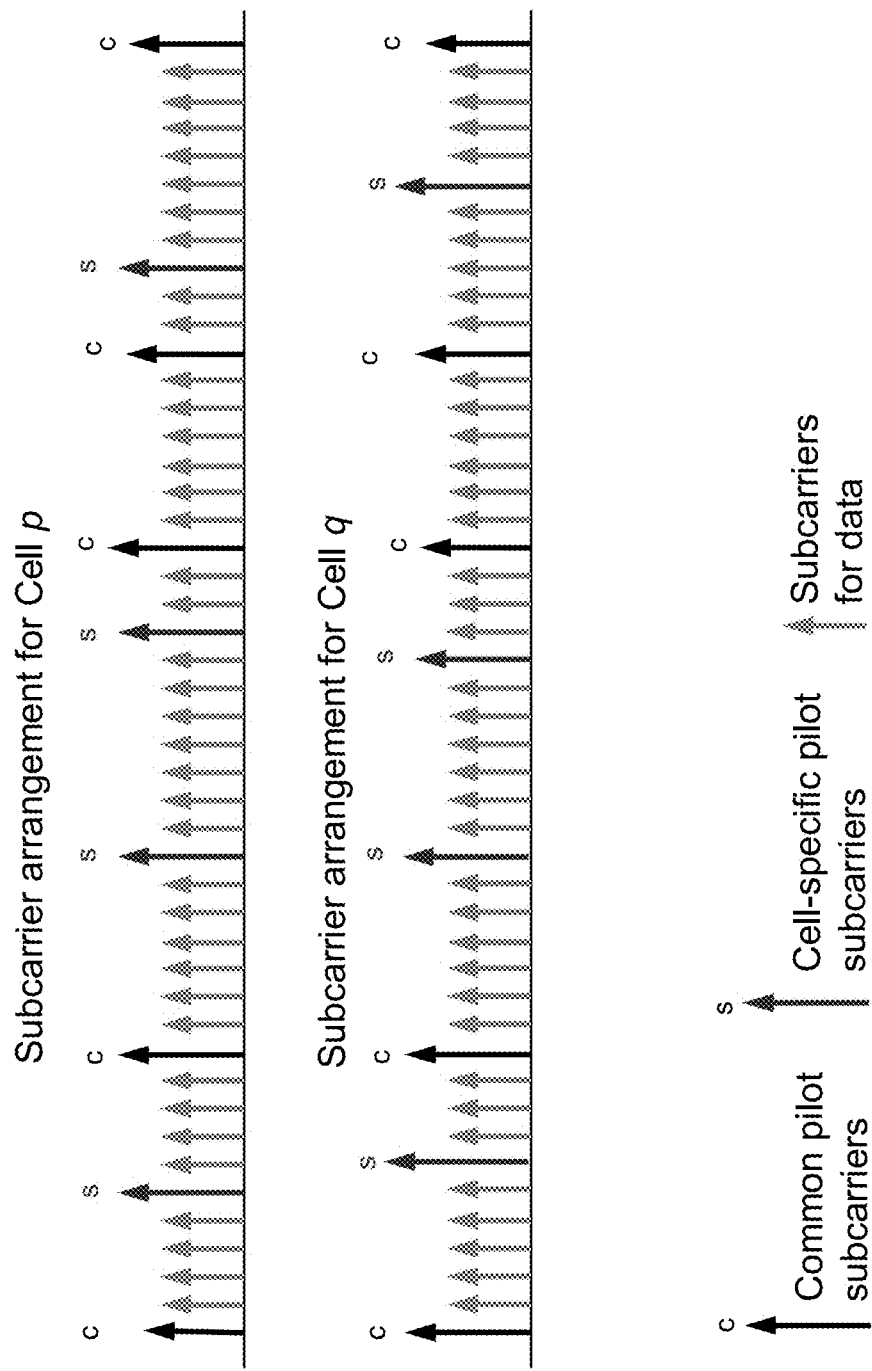
FIG. 5 shows pilot subcarriers divided into two groups: cell-specific pilot subcarriers and common pilot subcarriers.

The common pilot subcarriers for different cells are normally aligned in the frequency index at the time of transmission, as depicted in FIG. 5, which shows pilot subcarriers divided into two groups: cell-specific pilot sub-carriers and common pilot subcarriers. The cell-specific pilot subcarriers for different cells are not necessarily aligned in frequency. They can be used by the receiver to extract cell-specific information. The common pilot subcarriers for different cells may be aligned in frequency, and possess a set of attributes common to all base stations within the network. Thus, every receiver within the system is able to exploit these common pilot subcarriers without interference problem. The power of the pilot subcarriers can be varied through a particular power control scheme and based on a specific application.

If the ith subcarrier is used as a pilot subcarrier at the pth cell for the common purposes, it is not necessary to consider the second term on the right hand side of equation (1) to be interference. Instead, this term can be turned into a coherent component of the desirable signal by designing the common pilot carriers to meet the criteria specified in the aspects of this invention, provided that base stations at all cells are synchronized in frequency and time. In such a case the cell in which the receiver is located becomes irrelevant and, consequently, the received signal can be rewritten as:

$$s_i(t_k) = \sum_{m=1}^{M} a_{i,m}(t_k)e^{j\varphi_{i,m}(t_k)} \quad (2)$$

The common pilot subcarriers can be used for a number of functionalities, such as frequency offset estimation and timing estimation.

To estimate the frequency, normally signals at different times are utilized. In an example with two common pilot subcarriers of the same frequency index, the received signal at time $t_{k+1}$, with respect to the received signal at time $t_k$, is given by $$s_i(t_{k+1}) = e^{j2\pi f_i \Delta t}\sum_{m=1}^{M} a_{i,m}(t_{k+1})e^{j\varphi_{i,m}(t_{k+1})} \quad (3)$$

where $\Delta t = t_{k+1} - t_k$. If $\Delta t$ is much less than the coherence period of the channel and $$a_{i,m}(t_k) = c_i a_{i,m}(t_{k+1}) \quad (4)$$

and $$\phi_{i,m}(t_k) = \phi_{i,m}(t_{k+1}) + \beta_i \quad (5)$$

then the frequency can be determined by $$2\pi f_i \Delta t = \arg\{s_i(k)s_i(k+1)\} - \beta_i \quad (6)$$

where $c_i > 0$ and $-\pi \leq \beta_i \leq \pi$ or are predetermined constants for all values of m. And from all the frequency estimates $\{f_i\}$, a frequency offset can be derived based on a certain criterion.

For timing estimation, normally multiple common pilot carriers are required. In an example of two common pilot subcarriers, the received signal at $f_n$, is given by $$s_n(t_k) = e^{j2\pi\Delta f T_s(t_k)} \sum_{m=1}^{M} a_{n,m}(t_k)e^{j\varphi_{n,m}(t_k)} \quad (7)$$

where $\Delta f = f_n - f_i$ and $T_s$ denotes the sampling period. If $\Delta f$ is much less than the coherence bandwidth of the channel and $$a_{i,m}(t_k) = c(t_k)a_{n,m}(t_k) \quad (8)$$

and $$\phi_{i,m}(t_k) = \phi_{n,m}(t_k) + \gamma(t_k) \quad (9)$$

then $T_s$ can be determined by $$2\pi\Delta f T_s(t_k) = \arg\{s_i^*(t_k)s_n(t_k)\} - \gamma(t_k) \quad (10)$$

where $c(t_k) > 0$ and $-\pi \leq \gamma(t_k) \leq \pi$ are predetermined constants for all values of m.

Figure 6:
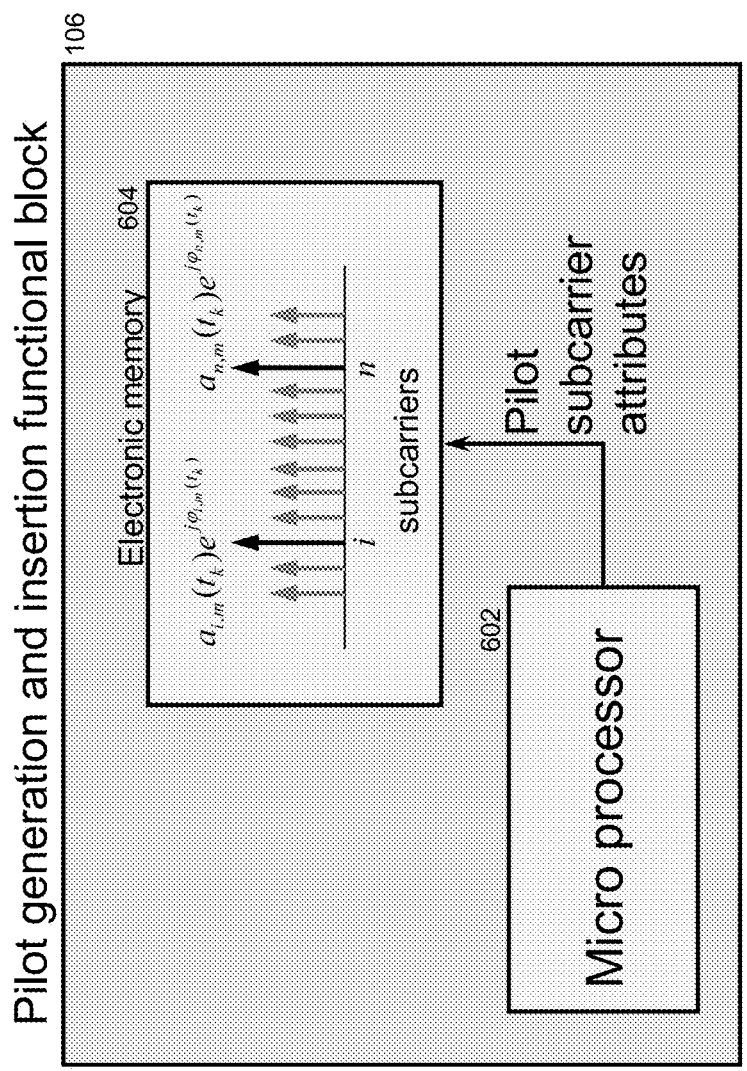
FIG. 6 is an embodiment of pilot-generation-and-insertion functional block shown in FIG. 1, which employs a microprocessor to generate pilot subcarriers and insert them into a frequency sequence contained in the electronic memory.

FIG. 6 is an embodiment of pilot-generation-and-insertion functional block 106 shown in FIG. 1, which employs a microprocessor 602 to generate pilot subcarriers and insert them into a frequency sequence contained in electronic memory 604. In one embodiment of the invention illustrated in FIG. 6, a microprocessor 602 embedded in the pilot-generation-and-insertion functional block 106 computes the attributes of the pilot subcarriers such as their frequency indices and complex values specified by their requirements, and insert them into the frequency sequence contained in the electronic memory 604, such as a RAM, ready for the application of IFFT.

Diversity for Common Pilot Subcarriers

Considering equation (2), which is the sum of a number of complex signals, it is possible for these signals to be destructively superimposed on each other and cause the amplitude of the receiver signal at this particular subcarrier to be so small that the signal itself becomes unreliable. Phase diversity can help this adverse effect. In the example of frequency estima tion, a random phase $\theta_{l,m}$ can be added to another pilot subcarrier, say the lth subcarrier, which results in $$\phi_{l,m}(t_k) = \phi_{l,m}(t_k) + \theta_{l,m} \quad (11)$$

and $$\phi_{l,m}(t_{k+1}) = \phi_{l,m}(t_{k+1}) + \theta_{l,m} \quad (12)$$

where $\theta_{l,m}$ should be set differently for each cell, and provided that the following condition is met, $$\phi_{l,m}(t_k) = \phi_{l,m}(t_{k+1}) + \beta_l, \text{ for all values of } m \quad (13)$$

Figure 7:
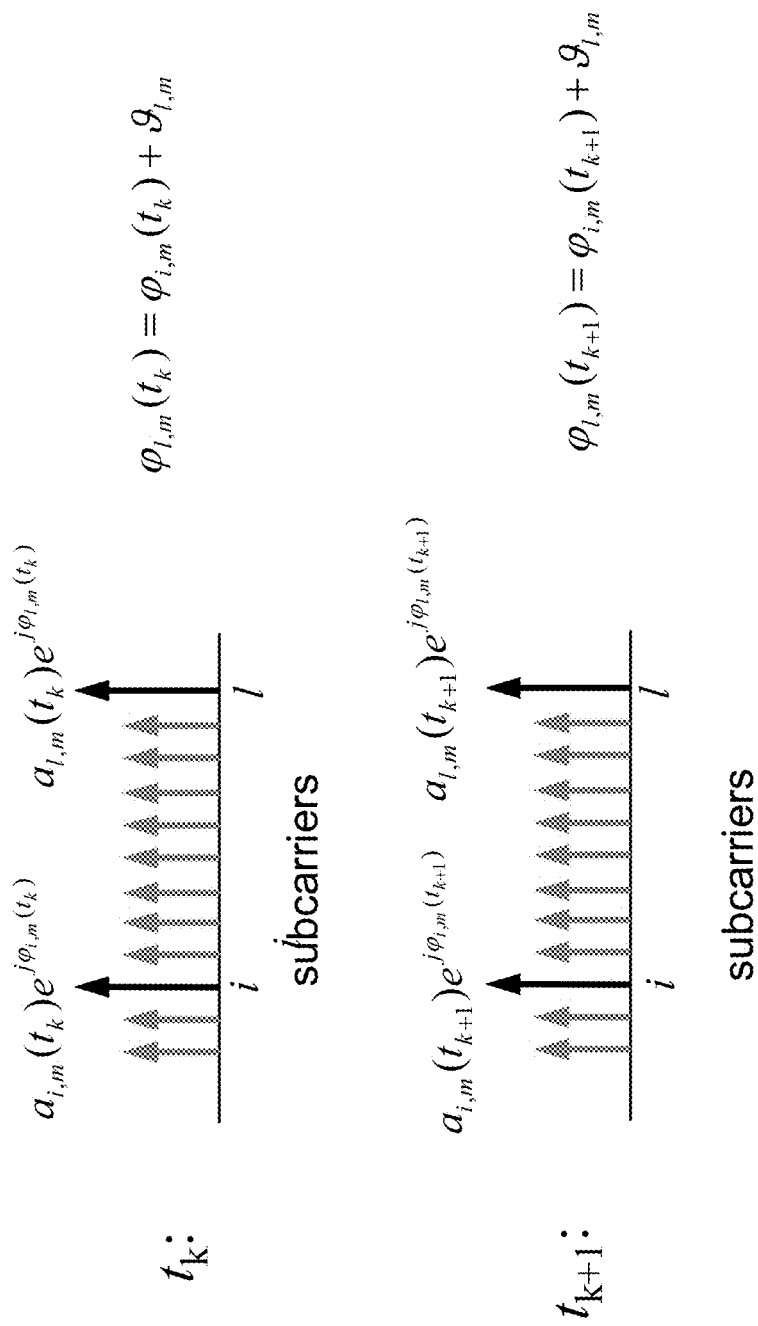
FIG. 7 shows that common pilot subcarriers are generated by a microprocessor of FIG. 6 to realize phase diversity.

With the phase diversity, it is expected that the probability of both $|s_i(t_k)|$ and $|s_i(t_k)|$ diminishing at the same time is relatively small. The embodiment of phase diversity is depicted in FIG. 7, which shows common pilot subcarriers generated by a microprocessor of FIG. 6 to realize phase diversity. It should be noted that time delay will achieve the equivalent diversity effect.

Figure 8:
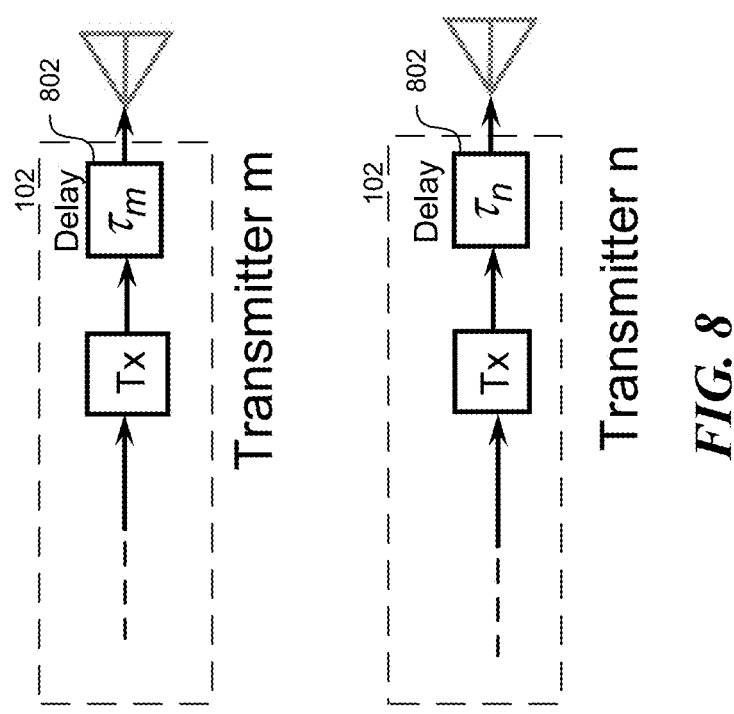
FIG. 8 is an embodiment of delay diversity, which effectively creates phase diversity by adding a random delay time duration, either in baseband or RF, to the time-domain signals.

Another embodiment is illustrated in FIG. 8, which effectively creates phase diversity by adding a random delay time duration 802, either in baseband or RF, to the time-domain signals.

Power Control for Pilot Subcarriers

In one embodiment of the invention, power control can be applied to the pilot subcarriers. The power of the pilot subcarriers can be adjusted individually or as a subgroup to 1. meet the needs of their functionalities;
2. adapt to the operation environments (e.g., propagation channels); and
3. reduce interference between cells or groups of cells.

In another embodiment power control is implemented differently for cell-specific pilot subcarriers and common pilot subcarriers. For example, stronger power is applied to common pilot subcarriers than to the cell-specific subcarriers.

Application to Multiple Antennas

The methods and processes provided by this invention can also be implemented in applications where multiple antennas are used within an individual sector, provided that the criteria specified either by equations (4) and (5) for frequency estimation or by equations (8) and (9) for timing estimation are satisfied.

Figure 9:
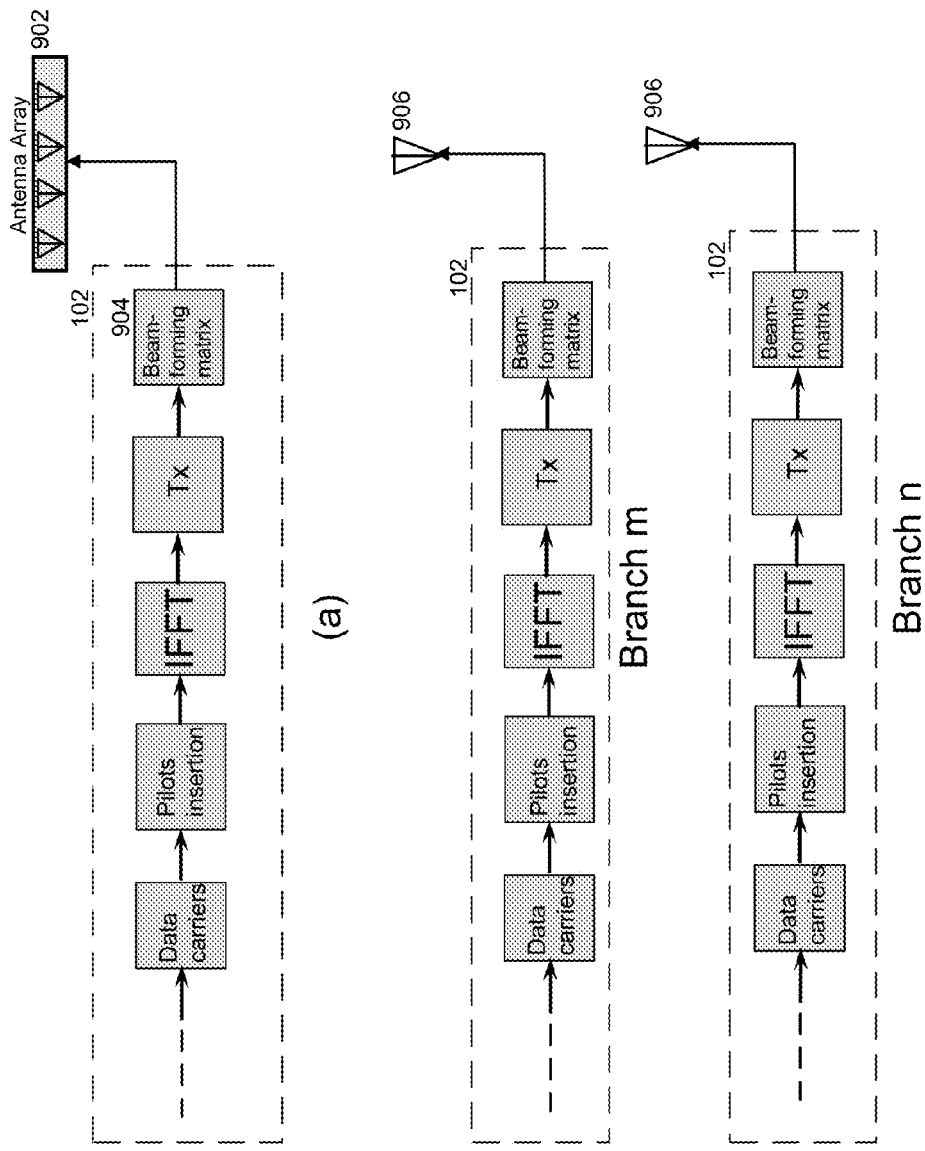
FIG. 9 shows two examples for extension to multiple antenna applications.

FIG. 9 shows two examples for extension to multiple antenna applications. In case (a) where there is only one transmission branch that is connected to an array of antennas 902 through a transformer 904 (e.g., a beam-forming matrix), the implementation is exactly the same as in the case of single antenna. In case (b) of multiple transmission branches connected to different antennas 906 (e.g., in a transmission diversity scheme or a multiple-input multiple-output scheme), the cell-specific pilot subcarriers for transmission branches are usually defined by a multiple-antenna scheme whereas the common pilot subcarriers for each transmission branch are generated to meet the requirements of (4) and (5) for frequency estimation or (8) and (9) for timing estimation.

Joint-Use of Cell-Specific and Common Pilot Subcarriers

In one embodiment the cell-specific and common pilot subcarriers can be used jointly in the same process based on certain information theoretic criteria, such as the optimization of the signal-to-noise ratio. For example, in the estimation of a system parameter (e.g. frequency), some or all cell-specific subcarriers, if they satisfy a certain criterion, such as to exceed a CIR threshold, may be selected to be used together with the common pilot subcarriers to improve estimation accuracy. Furthermore, the common pilot sub-carriers can be used along with the cell-specific subcarriers to determine the cell-specific information in some scenarios, one of which is the operation at the edge of the network.

Base Transmitters Synchronization

Base stations at all cells are required to be synchronized in frequency and time. In one embodiment of the invention the collocated base station transmitters are locked to a single frequency oscillator, as in the case where a cell is divided into sectors and the base stations of these sectors are physically placed at the same location.

Figure 10:
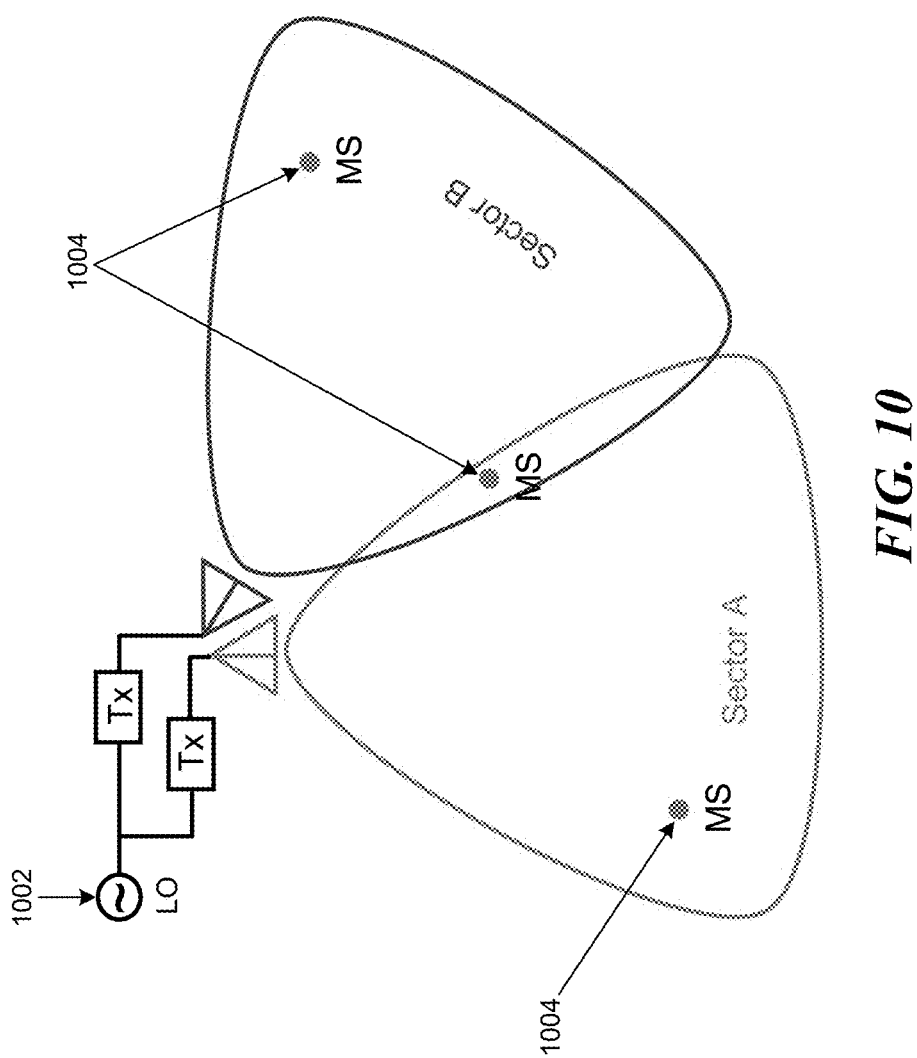
FIG. 10 is an embodiment of synchronization in frequency and time domains of two collocated base stations sharing a common frequency oscillator.
Figure 11:
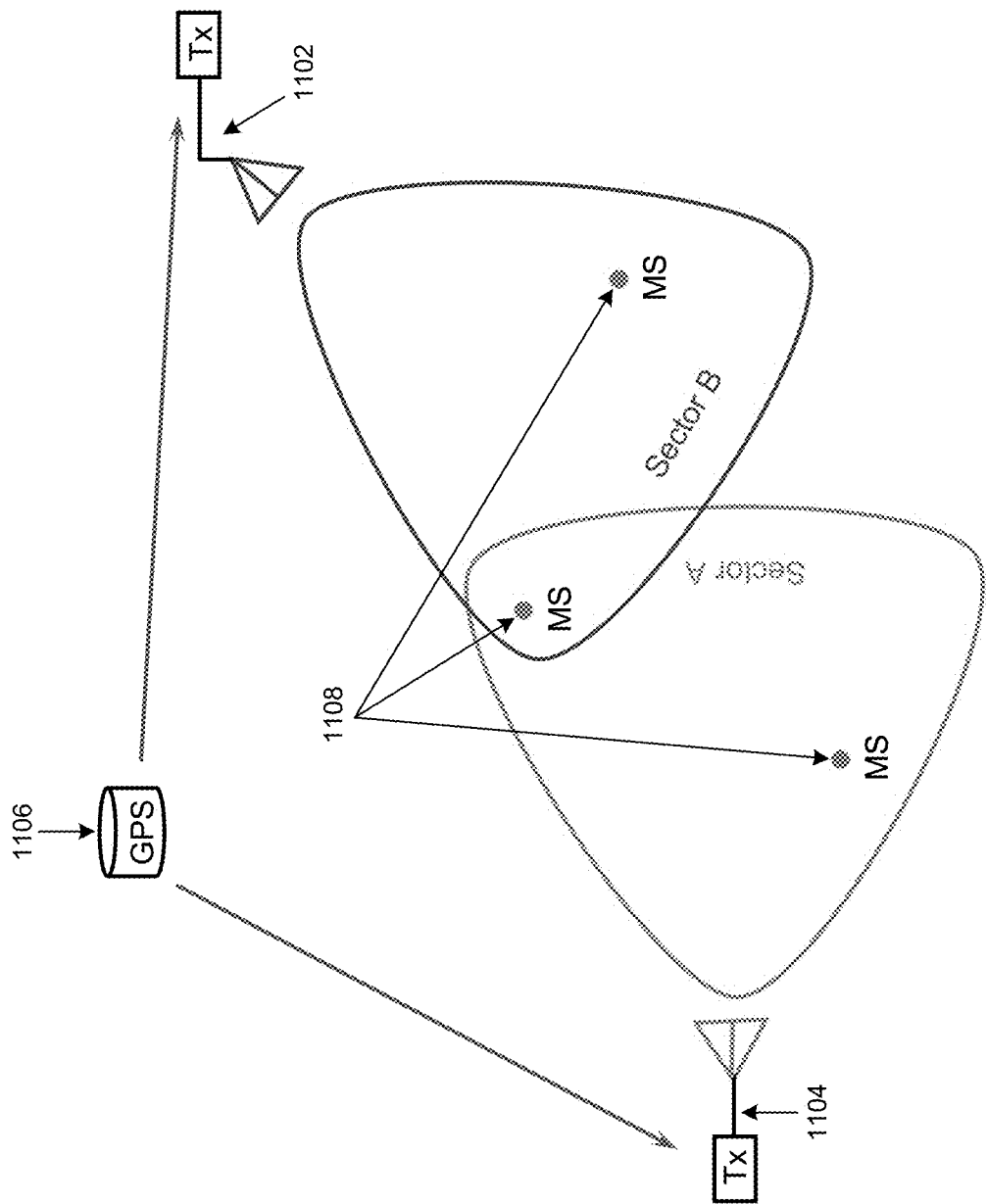
FIG. 11 is an embodiment of synchronization in frequency and time domains with base stations at different locations sharing a common frequency reference signal generated from the GPS signals.

FIG. 10 is an embodiment of synchronization in frequency and time domains of two collocated base stations sharing a common frequency oscillator 1002. Mobile stations 1004 covered by these two base stations do not experience interference when receiving the common pilot subcarriers. The base station transmitters that are located at different areas are locked to a common reference frequency source, such as the GPS signal. FIG. 11 depicts an embodiment of synchronization in frequency and time domains with base stations 1102 and 1104 at different locations sharing a common frequency reference signal generated from the GPS 1106 signals. Mobile stations 1108 covered by these two base stations 1102 and 1104 do not experience interference when receiving the common pilot subcarriers.

In some applications, the entire wireless network may consist of multiple groups of cells (or sectors) and each group may have its own set of common pilot subcarriers. In such scenarios, only those base stations within their group are required to synchronize to a common reference. While the common pilot subcarriers within each group are designed to meet the criteria defined by equations (4) and (5) or by (8) and (9) for the use by its base stations, a particular counter-interference process (e.g., randomization in frequency or power control) will be applied to different sets of common pilot subcarriers. This will cause the signals from the cells within the same group to add coherently while the signals from the cells in other groups are treated as randomized interference.

Figure 12:
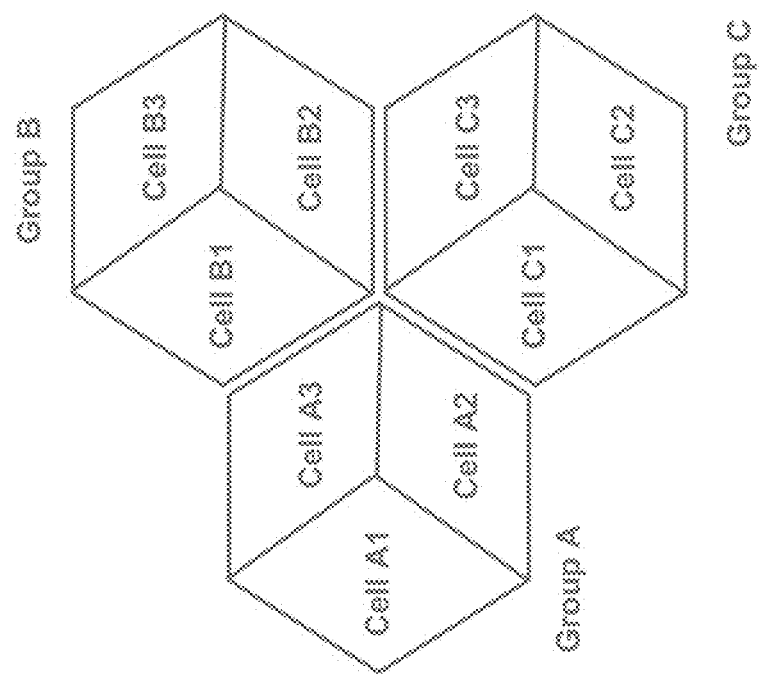
FIG. 12 is an embodiment depicting a wireless network consisting of three groups of cells (or sectors) and base stations in each group that share their own set of common pilot subcarriers.

One embodiment of such implementation is illustrated in FIG. 12, where a wireless network consists of three groups (A, B, and C) of cells (or sectors). The base stations within their own group share the same set of common pilot subcarriers. In this scenario, only those base stations within their group are required to synchronize to a common reference. While the common pilot subcarriers within each group are designed to meet the criteria defined in this invention, a particular counter-interference process (e.g., randomization in frequency) will be applied to different sets of common pilot subcarriers. For example, the base stations at Cells A1, A2, and A3 in Group A synchronize to their own common reference source and transmit the same set of common pilot subcarriers; and the base stations at Cells B1, B2, and B3 in Group B synchronize to their own reference source and transmit another set of common pilot subcarriers that are located at different places in the frequency domain.

Extension to Transmission of Data Information

All design processes, criteria, and methods described in the embodiments of this invention can be extended to applications where common network information is required to be distributed to all receivers within the network. In one example, all the base stations within the network transmit, along with some common pilot subcarriers, an identical set of data subcarriers in which the data information common to all the cells in the network is imbedded.

Figure 13:
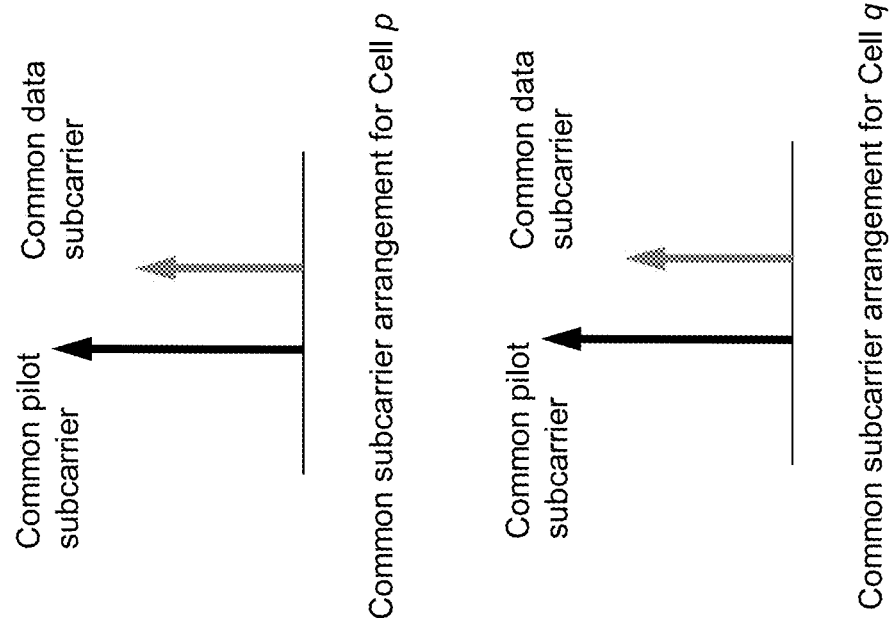
FIG. 13 shows all base stations within a network transmit, along with a common pilot subcarrier, a data subcarrier carrying data information common to all cells in the network.

FIG. 13 shows all base stations within a network transmit, along with a common pilot subcarrier, a data subcarrier carrying data information common to all cells in the network. A receiver within the network can determine the composite channel coefficient based on the common pilot subcarrier and apply it to the data subcarrier to compensate for the channel effect, thereby recovering the data information.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the system described herein. These and other changes can be made to the invention in light of the detailed description.

The elements and acts of the various embodiments described above can be combined to provide further embodiments.

These and other All of the above U.S. patents and applications and other references are incorporated herein by reference. Aspects of the invention can be modified, if necessary, to employ the systems, functions and concepts of the various references described above to provide yet further embodiments of the invention.

Changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A transmitting method for a base station in a cell within a group of cells in an orthogonal frequency division multiplexing system, the base station having multiple transmission branches, the method comprising:
    transmitting cell-specific pilot subcarriers, in accordance with a transmission diversity scheme or a multiple-input multiple-output scheme, wherein
    the cell-specific pilot subcarriers possess amplitudes, phases, and frequency subcarrier indices specific to the cell; and
    some of the cell-specific pilot subcarriers are not aligned in frequency subcarrier index with cell-specific pilot subcarriers transmitted by another base station in the group of cells;
    transmitting common pilot subcarriers in accordance with a common pilot transmission scheme, wherein:
    the common pilot subcarriers are aligned in frequency subcarrier index with common pilot subcarriers transmitted by other base stations in the group of cells;
    a ratio of an amplitude ($a_{i,m}$ and $a_{n,m}$) of two common pilot subcarriers having a same time index ($t_k$) that are transmitted via a common transmission branch is a constant for the group of cells; and
    a difference of a phase ($\phi_{i,m}$ and $\phi_{n,m}$) of two common pilot subcarriers having a same time index ($t_k$) that are transmitted via a common transmission branch is a constant for the group of cells; and
    controlling independently a transmission power of the cell-specific pilot subcarriers and a transmission power of the common pilot subcarriers.

2. The method of claim 1, wherein the transmission power of the cell-specific pilot subcarriers is higher than the transmission power of the common pilot subcarriers.

3. The method of claim 1, wherein the transmission power of the cell-specific pilot subcarriers is lower than the transmission power of the common pilot subcarriers.

4. The method of claim 1, wherein the cell-specific pilot subcarriers enable a mobile station in the cell to determine channel coefficients for a channel from the base station to the mobile station.

5. The method of claim 1, wherein the specific amplitudes, phases, and frequency subcarrier indices of the cell-specific pilot subcarriers enable a mobile station in the cell to differentiate the cell-specific pilot subcarriers from pilot subcarriers transmitted by base stations in other cells.

6. The method of claim 1, wherein the common pilot subcarriers enable a mobile station in the cell to determine composite channel coefficients for a composite channel, the composite channel corresponding to an aggregate of different channels from base stations in the group of cells to the mobile station.

7. In a cell within a group of cells in an orthogonal frequency division multiplexing system, a base station having multiple transmission branches, the base station comprising:
    a first transmitter component that is configured to transmit cell-specific pilot subcarriers, in accordance with a transmission diversity scheme or a multiple-input multiple-output scheme, wherein the cell-specific pilot subcarriers possess amplitudes, phases, and frequency subcarrier indices specific to the cell, and wherein some of the cell-specific pilot subcarriers are not aligned in frequency subcarrier index with cell-specific pilot subcarriers transmitted by another base station in the group of cells;
    a second transmitter component that is configured to transmit common pilot subcarriers in accordance with a common pilot transmission scheme, wherein:
    the common pilot subcarriers are aligned in frequency subcarrier index with common pilot subcarriers transmitted by other base stations in the group of cells; and
    a ratio of an amplitude ($a_{i,m}$ and $a_{n,m}$) of two common pilot subcarriers having a same time index ($t_k$) that are transmitted via a common transmission branch is a constant for the group of cells; and
    a difference of a phase ($\phi_{i,m}$ and $\phi_{n,m}$) of two common pilot subcarriers having a same time index ($t_k$) that are transmitted via a common transmission branch is a constant for the group of cells; and
    a controller component that is configured to control independently a transmission power of the cell-specific pilot subcarriers and a transmission power of the common pilot subcarriers.

8. The base station of claim 7, wherein the transmission power of the cell-specific pilot subcarriers is higher than the transmission power of the common pilot subcarriers.

9. The base station of claim 7, wherein the transmission power of the cell-specific pilot subcarriers is lower than the transmission power of the common pilot subcarriers.

10. The base station of claim 7, wherein the cell-specific pilot subcarriers enable a mobile station in the cell to determine channel coefficients for a channel from the base station to the mobile station.

11. The base station of claim 7, wherein the specific amplitudes, phases, and frequency subcarrier indices of the cell-specific pilot subcarriers enable a mobile station in the cell to differentiate the cell-specific pilot subcarriers from pilot subcarriers transmitted by base stations in other cells.

12. The base station of claim 7, wherein the common pilot subcarriers enable a mobile station in the cell to determine composite channel coefficients for a composite channel, the composite channel corresponding to an aggregate of different channels from base stations in the group of cells to the mobile station.

* * * * *

UNITED STATES PATENT AND TRADEMARK OFFICE
CERTIFICATE OF CORRECTION

PATENT NO. : 8,934,473 B2
APPLICATION NO. : 13/874278
DATED : January 13, 2015
INVENTOR(S) : Xiaodong Li et al.

It is certified that error appears in the above-identified patent and that said Letters Patent is hereby corrected as shown below:

In column 5, line 10, delete "$a_{i,m}(t_k)$ and" and insert -- $\square_{i,m}(t_k)$ and --, therefor.

In column 5, line 16, delete "$a_{i\text{-}p}(t_k)$) and" and insert -- $\square_{i,p}(t_k)$ and --, therefor.

In column 5, line 16, delete "$(t_k)$) will" and insert -- $(t_k)$ will --, therefor.

In column 5, lines 21-22, delete "$a_{i,p}(t_k)$) and" and insert -- $\square_{i,p}(t_k)$ and --, therefor.

In column 5, line 22, delete "$(t_k)$) with" and insert -- $(t_k)$ with --, therefor.

In column 6, line 13, delete "$\alpha_{i,m}(t_k)=c_i\alpha_{i,m}(t_{k+1})$" and insert -- $\square_{i,m}(t_k)=c_i\square_{i,m}(t_{k+1})$ --, therefor.

In column 6, line 38, delete "$\alpha_{i,m}(t_k)=c(t_k)\alpha_{n,m}(t_k)$" and insert -- $\square_{i,m}(t_k)=c(t_k)\square_{n,m}(t_k)$ --, therefor.

In column 7, line 2, delete "Ith" and insert -- ith --, therefor.

In column 9, line 64, in claim 1, delete "($a_{i,m}$ and $a_{n,m}$)" and insert -- ($\square_{i,m}$ and $\square_{n,m}$) --, therefor.

In column 10, lines 49-50, in claim 7, delete "and a ratio" and insert -- a ratio --, therefor.

In column 10, line 50, in claim 7, delete "($a_{i,m}$ and $a_{n,m}$)" and insert -- ($\square_{i,m}$ and $\square_{n,m}$) --, therefor.

Signed and Sealed this
Twenty-ninth Day of December, 2015

Michelle K. Lee
*Director of the United States Patent and Trademark Office*